(12) United States Patent
Nevanlinna et al.

(10) Patent No.: US 11,578,234 B2
(45) Date of Patent: Feb. 14, 2023

(54) PROCESS AND APPARATUS FOR TREATING TALL OIL

(71) Applicant: Neste Oyj, Espoo (FI)

(72) Inventors: Ville Nevanlinna, Porvoo (FI); Kim Vikman, Porvoo (FI); Jan Wahlström, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 16/926,235

(22) Filed: Jul. 10, 2020

(65) Prior Publication Data

US 2021/0009858 A1    Jan. 14, 2021

(30) Foreign Application Priority Data

Jul. 10, 2019  (FI) ..................................... 20195624

(51) Int. Cl.
| | | |
|---|---|---|
| *C09F 3/00* | (2006.01) | |
| *B01D 3/14* | (2006.01) | |
| *B01D 3/32* | (2006.01) | |
| *B01D 5/00* | (2006.01) | |
| *B01D 17/02* | (2006.01) | |
| *C11B 13/00* | (2006.01) | |

(52) U.S. Cl.
CPC ................ *C09F 3/00* (2013.01); *B01D 3/148* (2013.01); *B01D 3/32* (2013.01); *B01D 5/0003* (2013.01); *B01D 5/009* (2013.01); *B01D 5/0027* (2013.01); *B01D 5/0063* (2013.01); *B01D 5/0075* (2013.01); *B01D 5/0081* (2013.01); *B01D 17/0214* (2013.01); *C11B 13/005* (2013.01)

(58) Field of Classification Search
CPC ................................ C09F 3/00; C11B 13/005
See application file for complete search history.

(56) References Cited

U.S. PATENT DOCUMENTS

| | | | |
|---|---|---|---|
| 1,266,957 A * | 5/1918 | Kress | ..................... D21C 11/06 |
| | | | 162/14 |
| 2,886,492 A | 5/1959 | Hanson et al. | |
| 2,894,880 A | 7/1959 | Sisson et al. | |

(Continued)

FOREIGN PATENT DOCUMENTS

| | | |
|---|---|---|
| EP | 0188387 A2 | 7/1986 |
| EP | 3594317 A1 | 1/2020 |

(Continued)

OTHER PUBLICATIONS

Cecil L. Smith, Distillation Control: An Engineering Perspective, 1-69 (2012) [Chapter 1].*

(Continued)

*Primary Examiner* — Peter F Godenschwager
(74) *Attorney, Agent, or Firm* — Buchanan Ingersoll & Rooney PC

(57) ABSTRACT

The present disclosure relates to a process for treating a feedstock containing tall oil, the process including separation of a light stream from the feedstock, followed by removal of a heavy fraction from the feedstock, in which process the separation of the light stream from the feedstock a fractionator is used and at least one product is collected from the light stream. The disclosure also relates to an apparatus for use in the process and use of a fractionator in dehydration of a feedstock containing tall oil.

21 Claims, 2 Drawing Sheets

(56) References Cited

U.S. PATENT DOCUMENTS

| | | | |
|---|---|---|---|
| 3,644,179 A | | 2/1972 | Knoer et al. |
| 3,745,063 A | * | 7/1973 | Fisher ................ D21C 11/06 |
| | | | 162/239 |
| 3,778,485 A | | 12/1973 | Prochazka et al. |
| 3,871,951 A | * | 3/1975 | Drew .................. D21C 1/02 |
| | | | 162/14 |
| 3,926,936 A | | 12/1975 | Lehtinen |
| 5,964,987 A | | 10/1999 | Duncan et al. |
| 6,107,456 A | | 8/2000 | Huibers |
| 6,297,353 B1 | | 10/2001 | Fuenzalida Diaz et al. |
| 9,175,228 B2 | | 11/2015 | Nousiainen et al. |
| 9,181,494 B2 | | 11/2015 | Nousiainen et al. |
| 9,719,047 B2 | | 8/2017 | Stigsson et al. |
| 9,926,503 B2 | | 3/2018 | Laumola et al. |
| 10,144,889 B2 | | 12/2018 | Nousiainen et al. |
| 2011/0301326 A1 | | 12/2011 | Foxen |
| 2013/0232851 A1 | | 9/2013 | Nousiainen et al. |
| 2013/0245301 A1 | | 9/2013 | Nousiainen et al. |
| 2013/0245342 A1 | | 9/2013 | Laumola et al. |
| 2013/0306518 A1 | | 11/2013 | Petri |
| 2015/0052807 A1 | | 2/2015 | Nousiainen et al. |
| 2015/0353866 A1 | | 12/2015 | Stigsson et al. |
| 2016/0024407 A1 | | 1/2016 | Nousiainen et al. |

FOREIGN PATENT DOCUMENTS

| | | | | |
|---|---|---|---|---|
| FI | | 127491 B | | 7/2018 |
| GB | | 1051855 | | 12/1966 |
| JP | | S 49-133313 A | | 12/1974 |
| JP | | S 50-010325 B1 | | 4/1975 |
| JP | | H 11-246873 A | | 9/1999 |
| JP | | 2000-219891 A | | 8/2000 |
| JP | | 2016-505680 A | | 2/2016 |
| RU | | 2528201 C2 | | 9/2014 |
| WO | | 2009125072 A1 | | 10/2009 |
| WO | | WO-2014098763 A1 * | 6/2014 | ........... C11B 13/005 |

OTHER PUBLICATIONS

Cecil L. Smith, Distillation Control: An Engineering Perspective, 136-179 (2012) [Chapter 3].*
Cecil L. Smith, Distillation Control: An Engineering Perspective, 180-208 (2012) [Chapter 4].*
Allan Johansson, "By-Product Recovery and Valorisation in the Kraft Industry: A Review of Current Trends in the Recovery and Use of Turpentine and Tall Oil Derivatives," 2 Biomass 103 (1982). (Year: 1982).*
Finnish Office Action dated Oct. 28, 2019.
Finnish Search Report dated Oct. 28, 2019.
European Search Report dated Nov. 10, 2020, by the European Patent Office in corresponding European Application No. 20184414.9. (4 pages).
Office Action dated Nov. 9, 2020, by the Korean Patent Office in corresponding Korean Patent Application No. 10-2020-0083293, and an English Translation of the Office Action. (13 pages).
D. Sellinger et al., "Energy Conservation In The Distillation Of Wood Chemicals," Southern Pulp and Paper Manufacturer, May 1979, vol. 42, No. 5, pp. 24-26.
Office Action dated Jan. 5, 2021, by the Japanese Patent Office in corresponding Japanese Patent Application No. 2020-117483, and an English Translation of the Office Action. (8 pages).
S.M. Tarasov, "Kompleksnaya Pererabotka Drevesiny", Tekhnologiya lesokhimicheskikh l gidroliznykh proizvodstv, Moskva, MSU pub., 2016, pp. 1-139, with partial English Translation.
Office Action dated Dec. 17, 2020, by the Russian Patent Office in corresponding Russian Patent Application No. 2020122262, and an English Translation of the Office Action. (15 pages).
"Tall Oil Production and Processing", https://nzic.org.nz/app/uploads/2017/10/4G.pdf, Feb. 2, 2019. (11 pages).
C. Smith, "Distillation Control: An Engineering Perspective", 2012, s. 28 ja 50.
H. Kister, "Distillation Design", McGraw-Hill Education, 1992, pp. 20-25, 259 ja 421.
Notice of Opposition dated Jul. 27, 2021, by the Finnish Patent Office in corresponding Finnish Patent No. 128672. (18 pages).

* cited by examiner

PROCESS AND APPARATUS FOR TREATING TALL OIL

FIELD OF THE INVENTION

The present invention relates to a process for treating a feedstock comprising tall oil. Specifically, the invention relates to a process for treating tall oil, where the process comprises separating a light stream from the tall oil feedstock, followed by removal of a heavy fraction from the feedstock.

Crude tall oil is an oily product obtained as a by-product from the wood pulp process. Crude tall oil is a source for various organic components and comprises among others rosin acids (or resin acids), fatty acid, fatty alcohols and pitch. Various components have been collected from crude tall oil mainly by various distillation and evaporation techniques. There is an increased need for biomaterial sources for various organic components and crude tall oil is a useful biomaterial.

BACKGROUND OF THE INVENTION

There is an ever-increasing need for renewable biomaterial sources for various chemicals and organic components. Crude tall oil (CTO) or generally referred to as tall oil is a by-product from Kraft pulping process, especially when coniferous trees are used. Tall oil is a mixture of various organic components such as rosin acids, fatty acids, sterol like components and a non-evaporable fraction typically called pitch. Tall oil is therefore an excellent source for a wide range of different components and can be used as a feedstock in many different processes.

One area where tall oil has found use as a renewable biomaterial feedstock is in the production of renewable fuels and renewable fuel components. Fatty acids, such as the crude fatty acids (CFA) and tall oil fatty acids (TOFA) can be converted into renewable fuel components e.g. using hydrotreatment processes producing various hydrocarbons or through production of fatty acid methyl esters (FAME). In the production of CFA and/or TOFA another high value product tall oil rosin (TOR) is typically separated from the CFA/TOFA product, thereby adding additional value to the CTO refining process. TOR, like other two commercial rosin products, gum and wood rosins, comprises a mixture of many isomeric diterpene acids. The products of the CTO refining process may be used as fuel, intermediate chemicals for other chemicals, feedstock for renewable fuels production or biochemical manufacturing. Although untreated tall oil can be used as a direct feedstock in some processes it is generally useful to subject the CTO to various purification and fractionation steps. With the purification and fractionation steps the tall oil is refined and fractionated to various valuable streams that can be used as feedstock in upgrading process or be used as a product directly. Tall oil typically contains impurities such as metals and salts that can cause inactivation of catalysts used in the upgrading processes or lower the value of the products.

Publication U.S. Pat. No. 3,644,179 describes an example of tall oil fractionation by disclosing a method for continuous fractionation of tall oil, including introducing the tall oil continuously to a first thin film evaporation zone, followed by introducing the heavy fraction from the first evaporation into a second thin film evaporation. In the described method the first evaporation zone withdraws a light end stream and the second evaporation zone results in separating heavy ends from the tall oil. The remains are subjected to a fractionation zone where at least stream containing rosin acids and a stream containing fatty acids are fractionated from the tall oil.

An example of a process for purifying tall oil material is presented in publication U.S. Pat. No. 9,181,494, where the process comprises evaporating the tall oil material in first evaporation step to produce a first fraction comprising light hydrocarbons and water and a second fraction comprising fatty acids, resin acids, neutral substances and residue components. The second fraction is subjected to a second evaporation including two evaporation steps to produce a third fraction comprising fatty acids, resin acids and light neutral substances and a residue fraction. During evaporation steps, the impurities, such as metals and solids, are retained in the concentrate and the condensate retrieved from the evaporation is ready to be fed to the hydroprocessing reactor.

Publication U.S. Pat. No. 9,719,047 describes a process for refining of crude tall oil, where refined CTO, i.e. a pre-treated CTO from which impurities have been washed and separated, is fractionated under vacuum into at least one stream of refined tall diesel or tall oil fatty acid. In the described process the refined CTO is charged to a first fractionation step for separation of TOFA and resin acids from tall oil pitch, followed by a second fractionation step wherein a stream rich in refined tall diesel or TOFA is separated from a stream rich in resin acids. The stream rich in refined tall diesel or TOFA can further be deoxygenated to form hydrocarbon compounds.

Publication U.S. Pat. No. 2,894,880 describes a method of fractionating tall oil for the production therefrom of a fraction that is substantially pure fatty acids and of other fractions containing commercially desirable admixtures of fatty acids and rosin acids. The described method includes introducing the crude tall of through heaters into a tower, which serves as a deodorization tower to remove moisture, low boiling colour bodies and unsaponifiables from the feedstock Further, the use of a falling film reboiler is described.

When a renewable biomaterial source such as tall oil is used as a feedstock in upgrading processes, it is important that the all useful components can be separated from less valuable products and that the yield of the valuable products is as high as possible. The known processes for refining tall oil are not able to separate all valuable products from the tall oil biomaterial and the yield of the most valuable products tall oil fatty acids (TOFA), crude fatty acids (CFA) and tall oil rosin (TOR) can still be low. In a refining process for renewable biomaterial it is also important that the process is robust and tolerable for changes in the biomaterial feedstock. When the feedstock is of biological origin, such as tall oil, there is always differences in composition and quality of the biomaterial. The biomaterial refining process should be able to handle variations in the feedstock, without resulting in variations in the final products.

BRIEF DESCRIPTION OF THE INVENTION

An object of the present invention is thus to provide a process and an apparatus for refining a renewable biomaterial comprising tall oil, in which refining process it is possible to separate and collect a variety of valuable products without compromising the yield of other valuable products, e.g. TOFA, CFA, TOR, especially TOFA. The object of the present invention is to provide a solution to the problems described above. The objects of the invention are achieved by a process and an apparatus which are characterised by what is stated in the independent claims. The preferred embodiments of the invention are disclosed in the dependent claims.

The present invention thereby provides a process for treating a feedstock comprising tall oil, the process comprising separation of a light stream from the feedstock, followed by removal of a heavy fraction from the feedstock, in which process the separation of the light stream from the feedstock a fractionator is used and at least one product is collected from the light stream.

The present invention also provides an apparatus for performing the process according to the invention, the apparatus comprising:
- means for introducing a feedstock into a fractionator,
- the fractionator for separating a light stream from the feedstock, the fractionator including a reboiler system,
- an arrangement for collecting as a distillate a product from the separated light stream,
- means for collecting and subjecting the fractionator bottom for separation of a heavy fraction from the feedstock.

The present invention still further provides for a use of a fractionator in a process for dehydrating a feedstock comprising tall oil.

An advantage of the process according to the present invention is that the process provides a robust process for refining tall oil, in which process various valuable products can be separated and collected from a tall oil feedstock.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
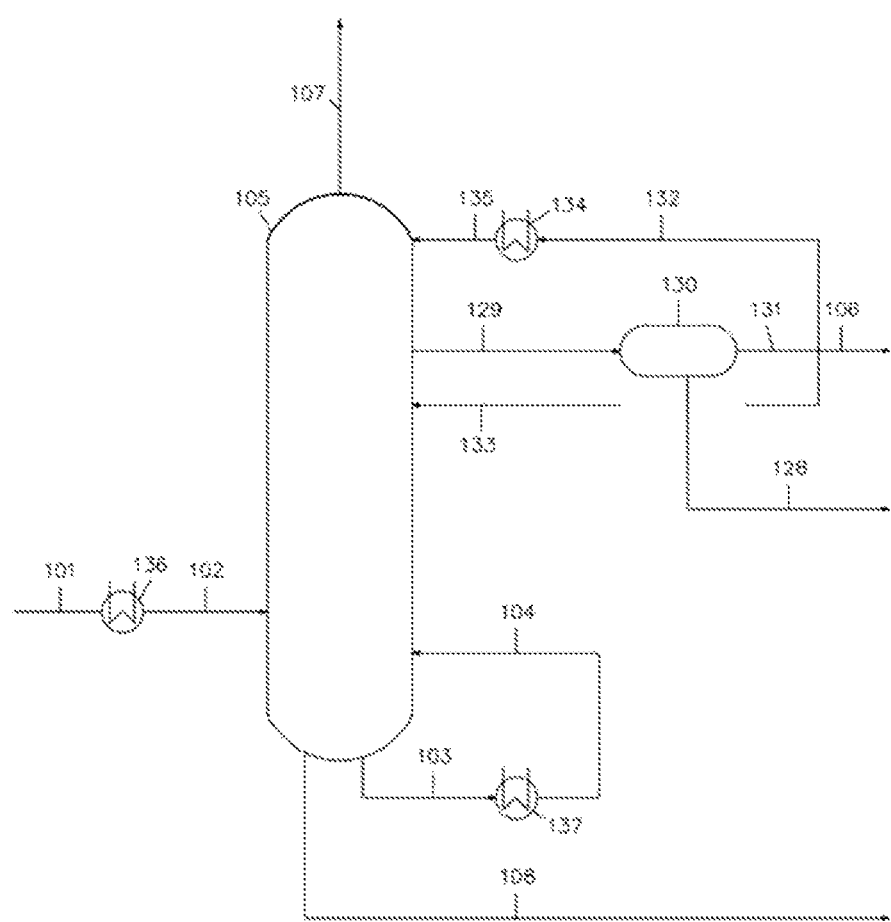
FIG. 1 illustrates an embodiment of the current invention.

The present invention relates to a process of treating a feedstock comprising tall oil. With the term "tall oil" is meant tall oil in general. An alternative term for tall oil as used herein is "crude tall oil", i.e. an untreated tall oil material. Tall oil originates as a by-product from the Kraft pulping process. Tall oil typically comprises a fraction having acidic properties, originating from carboxyl group —COOH and a neutral fraction, which sometimes is called the unsaponifiable fraction. This neutral fraction can constitute up to 25 weight-% of the total tall oil material. The acidic fraction of tall oil can be divided in two major sub-groups; the fatty acid fraction and the rosin acid fraction. Each of these fractions and groups of tall oil contain a number of various individual compounds and components. Therefore, it is obvious that tall oil is an attractive feedstock and it contains many potentially valuable and useful components that can be separated from the biomaterial.

The feedstock of the current process comprises tall oil, which means that the feedstock can also contain other streams besides tall oil. In one embodiment of the invention the feedstock comprises other biomaterial such as fats and oil of biological origin. The feedstock can also comprise other streams or fractions that are of biological origin. The feedstock can therefore also comprise fractions or streams from biomass-to-liquid (BTL) processes where various amounts of biomaterial have been used. In some embodiments of the invention, the feedstock can also contain recycled streams taken downstream from the fractionator such as light oils from vacuum systems and/or streams taken from processing fossil-based or renewable material, such as hydrogenated light or middle distillate streams.

The process comprises the steps of separating from the feedstock a light stream, followed by removal of a heavy fraction from the feedstock. The light stream comprises mainly organic molecules of carbon number up to C10. The heavy fraction comprises organic molecules of carbon number more than C10. According to the present invention a fractionator is used to separate the light stream and at least one product is collected from the light stream either directly from the fractionator or after the fractionator using a phase separator.

The light stream separated from the feedstock is any stream of volatiles including light organic matter and water. The light organic matter can mainly be any organic compound with a boiling point of up to 200° C. Some organic compounds of the light organic matter may have a boiling point of over 200° C. The separation of a light stream from the tall oil feedstock is also referred to as a dehydration step, i.e. the removal of water. The volatiles include a variety of organic molecules including turpentine.

According to the invention, at least one product is collected from the light stream after separation of the light stream from the feedstock comprising tall oil. The light stream can comprise a variety of organic molecules and the product can be any suitable organic component or compound that can be collected as a product. In one embodiment of the invention, the product collected from the light stream is turpentine.

Turpentine, also called oil of turpentine, is typically a mixture of $C_{10}H_{16}$ monoterpene hydrocarbons like alpha-pinene. Turpentine also contains monocyclic terpenes, aromatics, oxygenated compounds and polymeric materials. Turpentine is abundantly used by the chemical industry in various applications mainly as a solvent, such as in paints, varnishes, rubber and plastics.

The process also includes removal of a heavy fraction from the tall oil feedstock. The heavy fraction or non-distillable fraction is typically referred to as pitch. The heavy fraction or pitch is typically removed by any suitable distillation or evaporation techniques to separate the acid fraction of the tall oil. The residue which is not distillable is collected as the heavy fraction. The steps of removing the heavy fraction is typically referred to as depitching. The distillable acid fraction is typically further processed in various upgrading processes.

According to the invention, a fractionator is used in the separation of the light stream from the feedstock. The separation of the light stream is performed using a fractionator capable of separating components from a mixture, in this case a feedstock comprising tall oil, based on the different boiling points of the components.

In an embodiment, the fractionator comprises one or more reboiler(s) and an arrangement for condensing vapour to obtain a distillate and a reflux liquid.

In an embodiment, the arrangement for condensing vapour to obtain a distillate is a direct condenser or a separate heat exchanger outside of the column of the fractionator.

The feed to the fractionator is introduced to the middle or bottom section of the fractionator column, where it is typically partly vaporised. Alternatively, a separate flash tank can be used to create vapour and liquid streams, which are introduced to the middle or bottom of the fractionator column. In one alternative embodiment, the feed is introduced directly to the reboiler of the fractionator. Fractionator feed can alternatively be preheated to reduce the reboiler duty requirement.

In an embodiment, the arrangement for condensing vapour comprises one or more mass transfer section(s).

Regardless of the mechanism of the feed, the vaporised gaseous part flows upwards in the fractionation column towards the one or more mass transfer sections. Mass transfer section can comprise trays, random packing, structured packing, liquid collectors, support grids, feed distributors and redistributors for vapour, liquid or two phase flow or any combination thereof. Mass transfer section shall provide adequate contact between liquid and vapour. The above-mentioned mass transfer equipment are also utilised as condensing section to condense the upwards flowing vapour by feeding cooled liquid to the column. Mass transfer section(s) are located at least above the feed section and liquid is collected at the bottom section of the fractionator column. In some embodiments, a mass transfer section can also be utilised below the feed in order to decrease the fraction of lights in the bottom streams.

A fractionator contains a reboiler arrangement, where the liquid stream flowing downwards in the fractionator, here referred to as reflux liquid (or reflux), is collected and vaporised again. In one embodiment of the invention, also the liquid feed introduced to the fractionator is directed to the reboiler. In practice, the reboiler therefore generates the vapours needed to drive the fractionator column. Reboiling can be arranged using one or more reboilers, which use hot utility or hot process stream as reboiling media. Reboiler arrangement comprises a collector tray or bottom sump from where the collected liquid, consisting of reflux liquid and liquid introduced by the feed, is flowing by gravity or is pumped to the reboiler. Part of the liquid is vaporised in the reboiler. Vapour and liquid are then returned back in a common two phase flow pipe or separately as vapour and liquid depending on reboiler type. In one embodiment of the invention, the bottom product is drawn directly from the reboiler.

The bottom of the fractionator column can have a baffle arrangement to be able to introduce fresh liquid feedstock and reflux liquid from the fractionator directly to the reboiler. Hot vapour or vapour-liquid mixture from the reboiler is returned to the bottom of the fractionator column. The hot vapour flows up-wards to the mass transfer section(s). The fractionation column bottom can be segmented to two or more segment(s) each with a separate reboiler. The fresh feedstock can be introduced directly to one or more of the reboilers or a separate reboiler can be used for the fresh feed while other reboiler are used only to re-vaporise the reflux from the column.

The upward flowing vapour from the feed and reboiler(s) are contacted with reflux introduced to the top of the mass transfer section. The mass transfer section(s) has several vapour-liquid equilibrium stages to concentrate the light stream including water. The acid fraction including fatty acids, rosin acids and heavier neutrals that the vapour or vapour-liquid mixture can contain, are concentrated to the liquid leaving the mass transfer section.

The light stream comprising turpentine and water is either condensed in a direct condenser or a separate heat exchanger outside the fractionator column. The direct condenser can be a mass transfer section, which provides contact area for vapour to condense to liquid by feeding cooled liquid to the top of the section. It is also possible to use an internal condenser within the fractionator column, The condensed liquid is drawn from the bottom of the mass transfer section and can from there be withdrawn to separate the product from the light stream. In one embodiment of the invention the condensed liquid is withdrawn from the bottom of the mass transfer section and pumped to a phase separator to remove water from the organic phase. The organic phase can be divided up to three streams; one of the streams can be used as a reflux to the top of the mass transfer section, another stream can be used as a pumparound cooling stream and the distillate product can be separated from one stream. While using an internal condenser, the condensate will flow downwards inside the fractionator column.

In one embodiment of the invention, the product collected from the light stream is turpentine, which can be separated from the water of the light stream using fractionation. Also, other separation techniques can be used. If a liquid-liquid phase separation is used, this can be achieved using a phase separator outside of the shell of the fractionator. Condensed liquid is pumped to the phase separator from the bottom of the mass transfer section. The water phase sinks to the bottom, from which the water can be withdrawn as waste water. The organic phase separated from the water phase mainly contain turpentine and can be collected from the top of the phase separator. Liquid-liquid separation can alternatively be performed within the fractionator column. Separation within the column is performed simultaneously with the vapour-liquid separation using phase separation internals situated below the condensing section of the fractionator column.

The turpentine containing organic phase can be collected as such or subjected to further processing if needed. The turpentine concentration of the organic phase, which is separated from the condensed liquid from the bottom of the separation bed, can be over 75%, preferably over 85%, more preferably over 95% and most preferably 99% or more.

The pumparound cooling stream is cooled with cold utility or cold process stream and fed to the top of the mass transfer section either directly or through an appropriate feed distributor.

In one embodiment of the invention the reboiler of the fractionator is integrated in the same shell as the rest of the fractionator. In another embodiment of the invention the reboiler(s) are situated outside of the rest of the fractionator. If the reboiler(s) are situated outside of the fractionator the fractionator can have a separate line from the bottom of the fractionator column to the reboiler.

The fractionator in the process according to the invention operates at a temperature from 100° C. to 250° C., preferably from 120° C. to 230° C. The temperature should be high enough to vaporise the volatiles forming the light stream. Besides the actual operational temperature, it is also important that the feedstock is not kept at a too high temperature for a long time. If the feedstock is kept at a too high temperature for too long, the components of tall oil will start to react and can degrade to unwanted by-products. The fractionator operates at a low pressure to facilitate vaporisation of the volatiles at a lower temperature to avoid unwanted degradation of the tall oil. The fractionator in the process according to the invention operates at a pressure of from 2 kPa to 20 kPa, preferably from 4 kPa to 12 kPa.

It has surprisingly been found that by using a fractionator with a reboiler arrangement both a valuable organic product from the light stream can be collected and the yield of acid fraction, in form of rosin acids and fatty acids can be increased. This is not achieved with an evaporator system, which only separates a light stream including water from the tall oil feedstock. The collected organic product, preferably a turpentine product, is very valuable and when an evaporator system has been used creating an ejector oil, this valuable product is lost. Also, by using a fractionator instead of an evaporator system the amount of acid fraction lost in the ejector oil is minimised while the acid fraction is collected in the mass transfer sections into the distillate from the fractionator.

The application of fractionator system provides benefits by introducing a buffer for fluctuations in feedstock concentration as it has several vapour-liquid equilibrium stages to smoothen the spikes in lights or heavy end concentration of the distillate or bottoms stream. This buffer can prevent bigger disturbances in downstream processes to which the fractionator system is connected. It is typical in fractionation plants that some feedstocks have accumulation of lights or heavies due to disturbances in upstream operations.

The bottom fraction from the fractionator is subjected to a process for removal of a heavy fraction from the feedstock. The removal of the heavy fraction can be performed using any known method in the field. The removal of a heavy fraction from the feedstock comprises evaporating the feedstock in at least one evaporator or distillation column to produce a depitched vapour and/or liquid acid fraction and a heavier pitch fraction, collecting the depitched fraction(s), and distilling the depitched fraction(s) to produce i) a lighter organic acid and neutral organic components fraction, a crude fatty acid fraction, CFA (114)

ii) a first heavier organic acid and neutral organic components fraction, a fraction comprising rosin (115, 116) in liquid form, and iii) a second heavier organic acid and neutral components fraction, a fraction comprising rosin (115) in gaseous form.

The separation of heavy fraction can be performed using an evaporator, such as a thin film evaporator, a short path evaporator or any other suitable evaporation technique. The fraction rich in rosin acids is subjected to a further purification or fractionation step (113). The fractionation of the fraction rich in rosin acids yields a stream of rosin acids practically free from fatty acids, or at least containing less than 5% fatty acids.

According to one embodiment of the invention, the removal of heavy fraction is performed in a process comprising:

evaporating the feedstock in a thin film evaporator (TFE) to produce a TFE overhead vapour fraction and a TFE residue fraction, evaporating the TFE residue in a short path evaporator (SPE) to produce a depitched acid fraction and a heavier pitch fraction, collecting and combining the TFE overhead vapour fraction and the depitched acid fraction, and distilling the combined TFE overhead vapour fraction and depitched acid fraction to produce fractions i), ii) and iii).

In an embodiment, after the removal of a heavy fraction from the feedstock the process further comprises one or more of the following steps:

recovering the heavy fraction (112), CFA fraction (114) and a fraction comprising rosin (115, 116);

redistilling, in a redistillation column (124), the rosin fraction (116) in liquid form, to produce a further purified rosin fraction (126) and a bottoms rosin fraction (127);

distilling, in a heads column (119), at least part of the CFA fraction (114) comprising crude fatty acid, to produce a light heads fraction (118) as a heads column distillate, and a further crude fatty acid fraction (117) as a heads column bottom fraction;

distilling, in a fatty acid column (120), the further crude fatty acid fraction (117) to produce fatty acid fraction (121) obtained as a fatty acid column distillate, and bottom oil (122) obtained as a fatty acid column bottom fraction;

recovering the light heads fraction (118), fatty acid fraction (121), and bottom oil (122); and hydrogenating the CFA fraction (114), the light heads fraction (118), and/or the rosin product (125).

The remains after the purification or fractionation of the rosin acid rich fraction is removed from the process. This remaining heavy fraction is typically called pitch (or heavy pitch fraction). The process for separation a fatty acid and rosin acid rich streams are generally called depitching. Besides the heavy fraction also CFA fraction and a fraction comprising rosin are recovered. The stream rich in CFA and rosin can be subjected to a distillation for separation of a CFA fraction, a rosin fraction and light heads fraction. At least part of the CFA fraction comprising CFA can be distilled in a heads column to produce a light heads fraction as a heads column distillate and a further CFA fraction as a heads column bottom fraction. The CFA fraction can still be subjected to a fatty acid distillation column for separating a fatty acid fraction obtained as a fatty acid column product and bottom oil obtained as a fatty acid distillation column bottom fraction. As a side stream also a combination of fatty acid and rosin acid fraction can be separated. The light heads fraction(s), fatty acid fraction, combination of fatty acid and rosin acid fraction and bottom oil are recovered. The rosin fraction separated from the crude fatty acid fraction can be subjected to a further redistillation column for purification of the rosin fraction in liquid form to produce a further purified rosin fraction and a bottom rosin fraction. The stream rich in rosins from the redistillation column is collected as a valuable product.

The collected crude fatty acid fraction and/or the tall oil fatty acid fraction can be collected and used in production of renewable diesel or renewable diesel components. The crude fatty acid fraction and/or tall oil fatty acid fraction can be subjected to a hydrogenation process, such as hydrodeoxygenation process. The hydrogenation process is here understood to mean any process for treating the fatty acids with hydrogen to produce hydrocarbons. A purification of the fatty acid material can precede the hydrogenation process.

The process according to the invention relates to refining and processing material of biological origin. Biomaterial always contain various amount of impurities depending on the origin of the biomaterial. The processes, feedstock and the various streams and fractions described herein can therefore be purified for removal of impurities such as solids, metals and salts. The purification methods include but are not limited to various washing steps, with or without addition of components to assists the formation of particles such as acids or complex forming components such as oxalic acid, citric acid, sulphuric acid, phosphoric acid, and/or ethylene-di-amine tetra-acetic (EDTA) acid or other organic weak acid. Solids can be removed by centrifugation, filtration, settling, sedimentation and/or decantation. Further, the purification may be performed at an elevated temperature to improve viscosity and salt solubility. The purification may be performed before the dehydration or in a later stage, e.g. for the waste-water dehydration stream, heavy fraction and/or for the CFA or light heads stream.

An object of the present invention is also to provide an apparatus for performing the process according to the invention, the apparatus comprising:

means for introducing a feedstock into a fractionator,
the fractionator for separating a light stream from the feedstock, the fractionator including a reboiler system,
an arrangement for collecting as a distillate a product from the separated light stream,
means for collecting and subjecting the fractionator bottom for separation of a heavy fraction from the feedstock.

DETAILED DESCRIPTION OF THE DRAWINGS

FIG. 1 illustrates an exemplary process flow of the process hereby presented.

Referring to FIG. 1 a feedstock comprising tall oil (101) is introduced to the fractionator (105). The feedstock (101) can be pre-heated using a heat exchanger (136) resulting in a pre-heated feedstock comprising tall oil (102). From the fractionator (105) a light stream (129) is withdrawn and introduced to a phase separator (130) for separation of the product (turpentine) from the water phase. The water phase is removed from the phase separator (130) through a waste-water line (128). From the phase separator an organic product line (131) is withdrawn. The organic product line (131) can contain a connector from which the line is separated to three different lines. The product (turpentine) is collected through a product line (106) for possible further processing or purification (not shown). A stream (133) can be withdrawn from the organic product line (131) as a reflux to the top of the mass transfer section. In addition, a separate line (132) be drawn from the organic product line (131) through a heat exchanger (134) to be used as a pumparound cooling stream (135) and reintroduced to the fractionator (105).

From the bottom of the fractionator (105) a bottom reboiler line (103) is withdrawn to a reboiler system (137). In the reboiler system (137) the bottom product is re-heated and returned through a return line (104) back to the fractionator (105). The heavy bottom fraction (108) is withdrawn from the fractionator (105) and is subjected for further processing such as removal of a heavy fraction, depitching (not shown). Alternatively, the bottom fraction from the fractionator (105) can be withdrawn from the bottom of the reboiler system (137), this alternative is not shown in the drawing.

The fractionator (105) also contains a line for providing the vacuum (reduced pressure) (107) in the fractionator (105).

Figure 2:
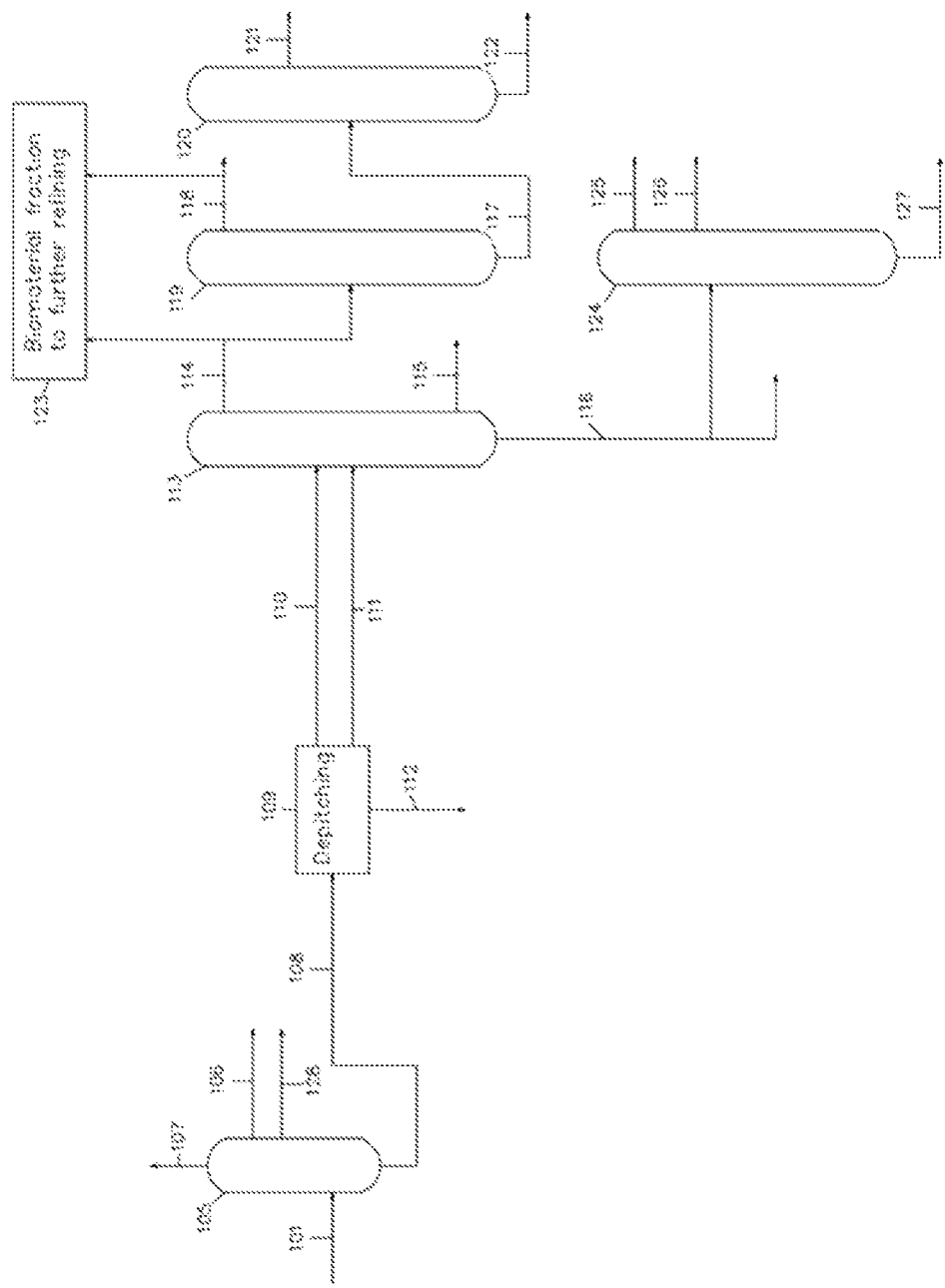
FIG. 2 illustrates a general process of the current invention for processing feedstock comprising tall oil.

FIG. 2 is a general drawing of the tall oil processing. Referring to FIG. 2 a feedstock comprising tall oil (101) is introduced to a fractionator (105). From the fractionator a product line (106) is withdrawn as well as a waste-water line (128). The bottom line (108) from the fractionator is subjected to a depitching step, where heavy pitch fraction (112) is removed and possible some light volatiles (109).

At least one or several streams (110, 111) comprising fatty and rosin acids in gas phase, liquid phase or combination of them is subjected to a rosin distillation column (113). The distillate, i.e. a lighter organic acid and neutral organic components fraction, a crude fatty acid fraction CFA (114) from the distillation column (113), is recovered as biomaterial fraction (123) and at least some part is fed to a heads column (119) to remove light heads (118) as a biomaterial fraction (123). A further distilled/purified crude fatty acid fraction (117) is obtained from the heads column (119) and can subsequently be fed to a fatty acid distillation column (120). The crude fatty acid fraction (117) is distilled in the fatty acid distillation column (120) to obtain a tall oil fatty acid stream (121) and a bottom oil fraction (122).

A rosin product (115) can be withdrawn as a side line from the rosin distillation column (113). The bottom from the rosin distillation column (113) is withdrawn as a rosin product line (116) and may be introduced to a rosin redistillation column (124). The redistilled rosin products can be withdrawn from column (124) as two separate rosin product lines (125, 126). The bottom of the rosin distillation column is withdrawn as line (127).

Example 1: Single-Stage Dehydration Vs. Fractionation Column Dehydration

Example 1 highlights the differences in CTO dehydration process between a conventional single-stage dehydration, such as a flash vessel, falling film evaporator or a thin film evaporator, and an embodiment described in FIG. 1.

Simulation studies were conducted on the dehydration alternatives. The feed to the dehydration consisted of crude tall oil with 37 wt-% free rosin acids, 44 wt-% free fatty acids, 3 wt-% terpenes, 2 wt-% water and 14 wt-% other neutral components.

With only a single separation stage in dehydration some volatile fatty and rosin acids end up in the overhead stream of the dehydration process. These losses reduce the yield of rosin and TOFA products. By adding separation stages and introducing a reflux stream to the process effectively rectifies the overhead stream from the fatty and rosin acids.

Table 1 summarizes the differences in product yields between single-stage dehydration and dehydration using a fractionator column. It can be concluded from the results that the fractionator arrangement minimizes the free fatty and rosin acid losses in dehydration which results improved yields for both rosin and TOFA products. Additionally, a new important side-product, crude turpentine is obtained.

TABLE 1

Comparison of single-stage dehydration and fractionation column dehydration. The %-values describes the product yield differences of using a fractionation column compared to a single-stage dehydration.

| Product yields | Dehydration with a fractionation column (difference to single-stage dehydration) |
|---|---|
| Crude tall oil | 0.0% |
| Rosin | 1.5% |
| Pitch | 0.0% |
| TOFA | 4.5% |
| Heads | 8.9% |
| Ejector Oil | −85.0% |
| Crude turpentine | 74% of terpenes in feed |

It will be obvious to a person skilled in the art that, as the technology advances, the inventive concept can be implemented in various ways. The invention and its embodiments are not limited to the examples described above but may vary within the scope of the claims.

The invention claimed is:
1. A process for treating a feedstock containing tall oil, the process comprising:
separating a light stream from the feedstock, wherein in the separating of the light stream from the feedstock a fractionator is used, the fractionator having one or more reboiler(s) and an arrangement for condensing vapour to obtain a distillate and a reflux liquid, the distillate containing turpentine and water;

after the separating of the light stream from the feedstock, removing a heavy fraction from the feedstock, and separating the turpentine from the distillate to obtain a turpentine product, wherein the turpentine product contains turpentine in a concentration of over 75%.

2. The process according to claim 1, wherein the arrangement for condensing vapour to obtain a distillate is a direct condenser or a separate heat exchanger outside of a column of the fractionator.

3. The process according to claim 2, wherein the arrangement for condensing vapour includes one or more mass transfer section(s).

4. The process according to claim 3, wherein the reboiler of the fractionator is integrated into a same shell as a remainder of the fractionator.

5. The process according to claim 3, wherein the one or more mass transfer section(s) comprise at least one or more of the following:

trays, random packing, structured packing, liquid collectors, support grids, feed distributors or redistributors for vapour, liquid or two phase flow, or any combination thereof.

6. The process according to claim 5 wherein the reboiler of the fractionator is integrated into a same shell as a remainder of the fractionator.

7. The process according to claim 2, wherein the reboiler of the fractionator is integrated into a same shell as a remainder of the fractionator.

8. The process according to claim 1, wherein the reboiler of the fractionator is integrated into a same shell as a remainder of the fractionator.

9. The process according to claim 1, wherein the turpentine product contains turpentine in a concentration selected from the group consisting of over 85%, over 95%, and 99% or more.

10. The process according to claim 1, comprising:

leading residue from the fractionator to one or more evaporators or a distillation column for removal of the heavy fraction from the feedstock to obtain a stream containing rosin acids and fatty acids; and collecting the heavy fraction containing tall oil pitch.

11. The process according to claim 1, wherein the fractionator operates at a temperature selected from the group consisting of 100° C. to 250° C. and 120° C. to 230° C.

12. The process according to claim 1, wherein the fractionator operates at a pressure selected from the group consisting of 2 kPa to 20 kPa and 4 kPa to 12 kPa.

13. The process according to claim 1, wherein removing a heavy fraction from the feedstock comprises:

evaporating the feedstock in at least one evaporator or distillation column to produce at least one of a depitched vapour or liquid acid fraction and a heavier pitch fraction;

collecting the depitched fraction(s); and distilling the depitched fraction(s) to produce i) a lighter organic acid and neutral organic components fraction containing a crude fatty acid fraction, ii) a first heavier organic acid and neutral organic components fraction in liquid form and containing rosin, and iii) a second heavier organic acid and neutral organic components fraction in gaseous form and containing rosin.

14. The process according to claim 1, wherein after removing a heavy fraction from the feedstock the process comprises:

hydrogenating at feast one of a crude fatty acids fraction, a light heads fraction, or a rosin product.

15. The process according to claim 1, wherein after removing the heavy fraction from the feedstock the process comprises redistilling, in a redistillation column, a rosin fraction in liquid form, to produce a further purified rosin fraction and a bottoms rosin fraction.

16. The process according to claim 1, wherein after removing the heavy fraction from the feedstock the process comprises distilling, in a heads column, at least part of a crude fatty acids fraction containing crude fatty acid, to produce a light heads fraction as a heads column distillate, and a further crude fatty acid fraction as a heads column bottom fraction.

17. The process according to claim 1, wherein after removing the heavy fraction from the feedstock the process comprises distilling, in a fatty acid column, a further crude fatty acid fraction to produce fatty acid fraction obtained as a fatty acid column distillate, and bottom oil obtained as a fatty acid column bottom fraction.

18. The process according to claim 1, wherein after removing the heavy fraction from the feedstock the process comprises recovering a light heads fraction, a fatty acid fraction, and a bottom oil.

19. The process according to claim 1, wherein the fractionator has an arrangement that minimizes free fatty acid and rosin acid losses in dehydration.

20. The process according to claim 1, wherein the fractionator yields 1.5% more rosin product and 4.5% more tall oil fatty acids (TOFA) product, compared to single-stage dehydration.

21. The process according to claim 1, wherein the fractionator has vapour-liquid equilibration stages.

* * * * *